United States Patent [19]

Cahill-O'Brien et al.

[11] Patent Number: 5,515,693
[45] Date of Patent: May 14, 1996

[54] ENABLE SYSTEM FOR A CONTROLLED ATMOSPHERE SYSTEM FOR A REFRIGERATED CONTAINER

[75] Inventors: Barry P. Cahill-O'Brien; Michael W. Nevin, both of Syracuse; Richard L. Martin, Cicero, all of N.Y.

[73] Assignee: Carrier Corporation, Syracuse, N.Y.

[21] Appl. No.: 259,838

[22] Filed: Jun. 15, 1994

[51] Int. Cl.$^6$ ........................................ A61L 9/00
[52] U.S. Cl. .................. 62/179; 62/78; 62/127; 99/468; 426/419
[58] Field of Search .................. 62/78, 151, 178, 62/179, 180, 186, 239, 240, 229, 230, 126, 127; 99/468, 474, 475; 422/40; 426/418, 419

[56] References Cited

U.S. PATENT DOCUMENTS

| | | | |
|---|---|---|---|
| 4,829,774 | 5/1989 | Wassibauer et al. | 62/179 X |
| 4,961,322 | 10/1990 | Oguma et al. | 62/179 |
| 4,987,745 | 1/1991 | Harris | 62/78 |
| 5,156,009 | 10/1992 | Woodruff | 426/419 X |
| 5,332,547 | 7/1994 | Olson et al. | 422/40 X |
| 5,355,781 | 10/1994 | Liston et al. | 99/468 X |

*Primary Examiner*—Harry B. Tanner

[57] ABSTRACT

A refrigerated container is provided which has a refrigeration system and a controlled atmosphere system. The refrigeration system and the controlled atmosphere system are both provided with electronic controllers. The refrigeration controller is programmed with certain acceptable conditions under which the controlled atmosphere system will be allowed to operate. When these conditions are satisfied the refrigeration controller will send an enabling signal to the controlled atmosphere systems controller allowing it to operate. If at any time during operation the refrigeration controller determines that the controlled atmosphere system should not operate, it removes the electrical enabling signal, causing the controlled atmosphere system to stop.

10 Claims, 4 Drawing Sheets

ENABLE SYSTEM FOR A CONTROLLED ATMOSPHERE SYSTEM FOR A REFRIGERATED CONTAINER

BACKGROUND OF THE INVENTION

1. Field of the Invention

The invention relates to a controlled atmosphere system for a refrigerated container and specifically to a system for regulating the amount of nitrogen, oxygen, and carbon dioxide inside a refrigerated container resulting in an atmospheric composition that extends post harvest shelf life/or quality of fruits and vegetables.

2. Description of the Prior Art

Controlled atmosphere containers for the post-harvest transport and storage of agricultural commodities are well known in the art. Such systems are usually used in conjunction with a refrigeration unit designed to lower the temperature of the interior of the container to a desired optimum temperature for the load being shipped therein. It has been established that temperature is the most important factor in controlling the rate of deterioration of fruits and vegetables. A controlled atmosphere system is considered as a supplement to proper temperature and humidity control.

The purpose of a controlled atmosphere system is to control the amount of oxygen and carbon dioxide inside the refrigerated container to change the rate of ripening of the produce stored in the container. The system controls the amount of oxygen ($O_2$) and carbon dioxide ($CO_2$) by replacing them with nitrogen ($N_2$).

In early examples of controlled atmosphere systems for refrigerated containers, the modified atmosphere within the container was established, after loading, and not further modified during the period of storage or transportation. Problems with such systems included leakage both into and out of the container which changed the atmosphere. Subsequent technologies have provided for monitoring of oxygen and carbon dioxide levels within the container and have provided nitrogen and carbon dioxide sources to allow modification of the atmosphere during storage and transportation. A drawback to such systems was that supplies of carbon dioxide and nitrogen gas were required to maintain the desired atmosphere during normal lengths of transportation. Such gas sources were bulky and heavy and were not economically feasible to provide the gases required in a typical commercial application.

Systems have been developed wherein extremely high purity nitrogen gas is generated using an air separator of a type which incorporates membranes to divide a stream of ambient air, under pressure, into its principal constituents of oxygen and nitrogen. Some of such systems utilize an electronic controller to electrically operate a valve which will selectively increase or decrease the amount of nitrogen delivered from the membrane separator to the refrigerated container.

The controller is used to operate the controlled atmosphere system in conjunction with various functions of the refrigeration system. In one such system a thermostat placed in the container is used to determine if the temperature control range of the refrigeration system exceeds the operating temperature range of the controlled atmosphere system. This information is used to determine if the controlled atmosphere system should operate. In addition the controlled atmosphere system should not operate during the defrost cycle of the refrigeration system or when the refrigeration system is cooling the container cargo to its set point. To determine these conditions, in such system the controlled atmosphere controller receives various signals from sensors, relays and other components of the refrigeration system. If the determined conditions are met, the controller allows the controlled atmosphere system to start. If during operation these signals are not received the controller suspends operation of the controlled atmosphere system.

Such systems, it has been found, do not always reliably prevent interference with the operation of the refrigeration system by the controlled atmosphere system.

SUMMARY OF THE INVENTION

In the operation of container refrigeration systems having controlled atmosphere systems, it has been determined that the primary function of the system should be for refrigeration. Operation of the controlled atmosphere system should not effect the accuracy of the refrigeration system. Because the controlled atmosphere system relies on the conditions inside the refrigerated container to operate correctly, the controlled atmosphere system should not operate if these conditions are not met.

It is an object of the present invention to give the refrigeration controller of a refrigerated container refrigeration system having a controlled atmosphere system an active role in determining when the controlled atmosphere system should be allowed to operate.

It is a further object of this invention to program the controller of the refrigeration system with the acceptable conditions for the controlled atmosphere system operation.

It is a further object of the present invention to operate the controlled atmosphere system of a refrigerated container only when the refrigeration control determines it is acceptable and sends an electrical signal to the controlled atmosphere systems controller.

It is yet another object of the present invention to program the refrigeration system controller such that, if, at any time during its operation, the refrigeration controller determines that the controlled atmosphere system should not operate, it removes the electrical enabling signal, causing the controlled atmosphere system to stop.

The above and other objects of the invention are achieved by apparatus for controlling the temperature and atmosphere within a confined space which include a controlled atmosphere system for controlling the atmosphere within the space. Electrical control means are provided for controlling operation of the controlled atmosphere system. The controlled atmosphere system control means is operative to control the controlled atmosphere system only when it is receiving and enabling signal. A refrigeration system for controlling the temperature within the space is provided. A programmable electrical control means for controlling and monitoring the operation of the refrigeration system include means for determining if the controlled atmosphere system should be operating and, for generating a controlled atmosphere system enabling signal when such a determination has been made. Means are provided for communicating the enabling signal from the refrigeration system controller to the controlled atmosphere system controller.

BRIEF DESCRIPTION OF THE DRAWINGS

For a better understanding of these and other objects of the present invention, reference is made to the detailed description of the invention which is to be read in conjunction with the following drawings, wherein.

DESCRIPTION OF THE PREFERRED EMBODIMENT

Figure 1:
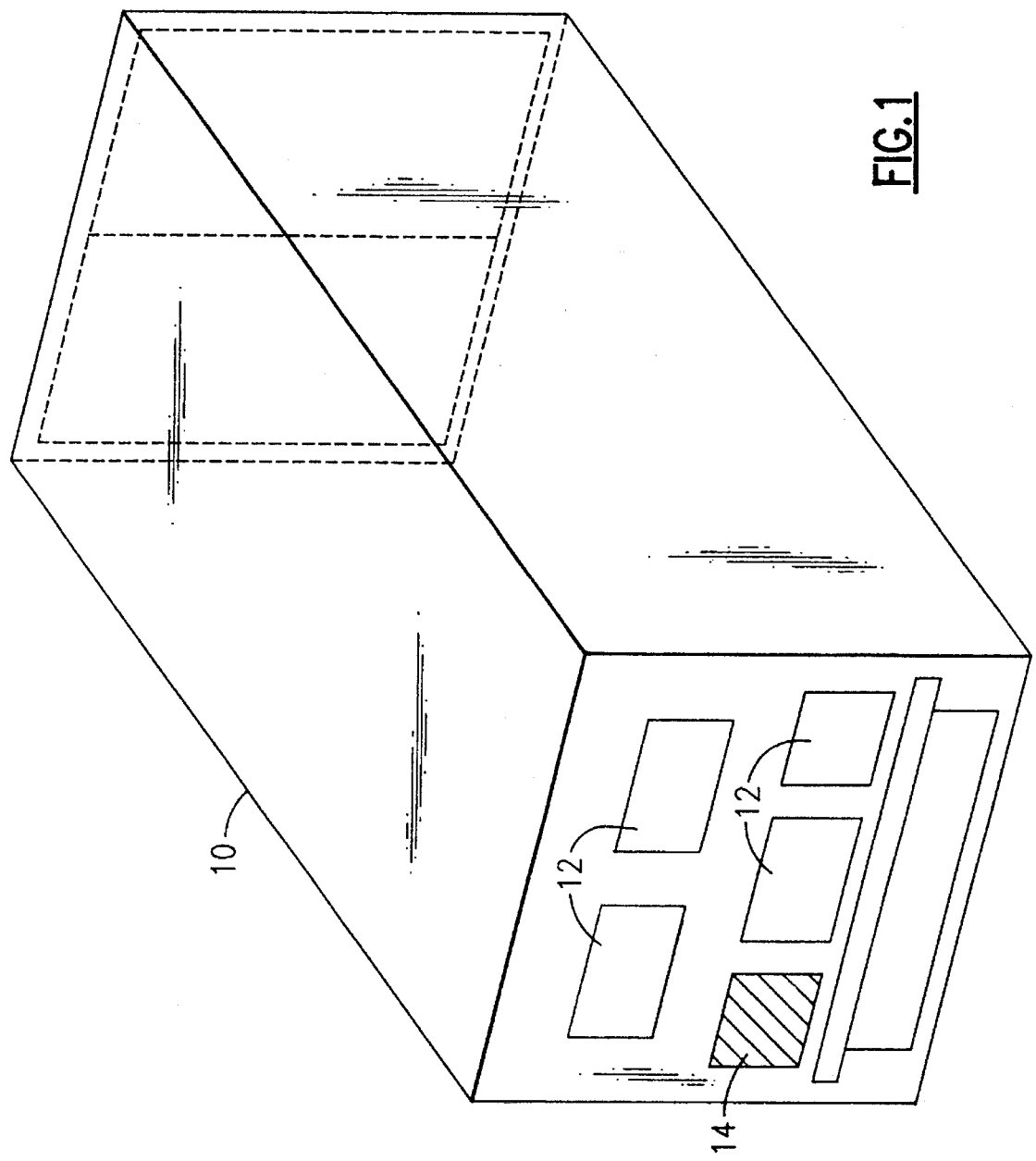
FIG. 1 is a simplified perspective view of a refrigerated transport container of the type for use with the present invention.

Referring first to FIG. 1 a refrigerated container 10 is shown which has associated therewith an integrated electrically operated refrigeration system, comprising several components 12, and, a controlled atmosphere system, a part of which 14 is shown. The refrigeration system 12 and the controlled atmosphere system are mounted at one end of the container and are adapted to regulate the temperature, and the atmosphere, respectively within the container 10.

Figure 2:
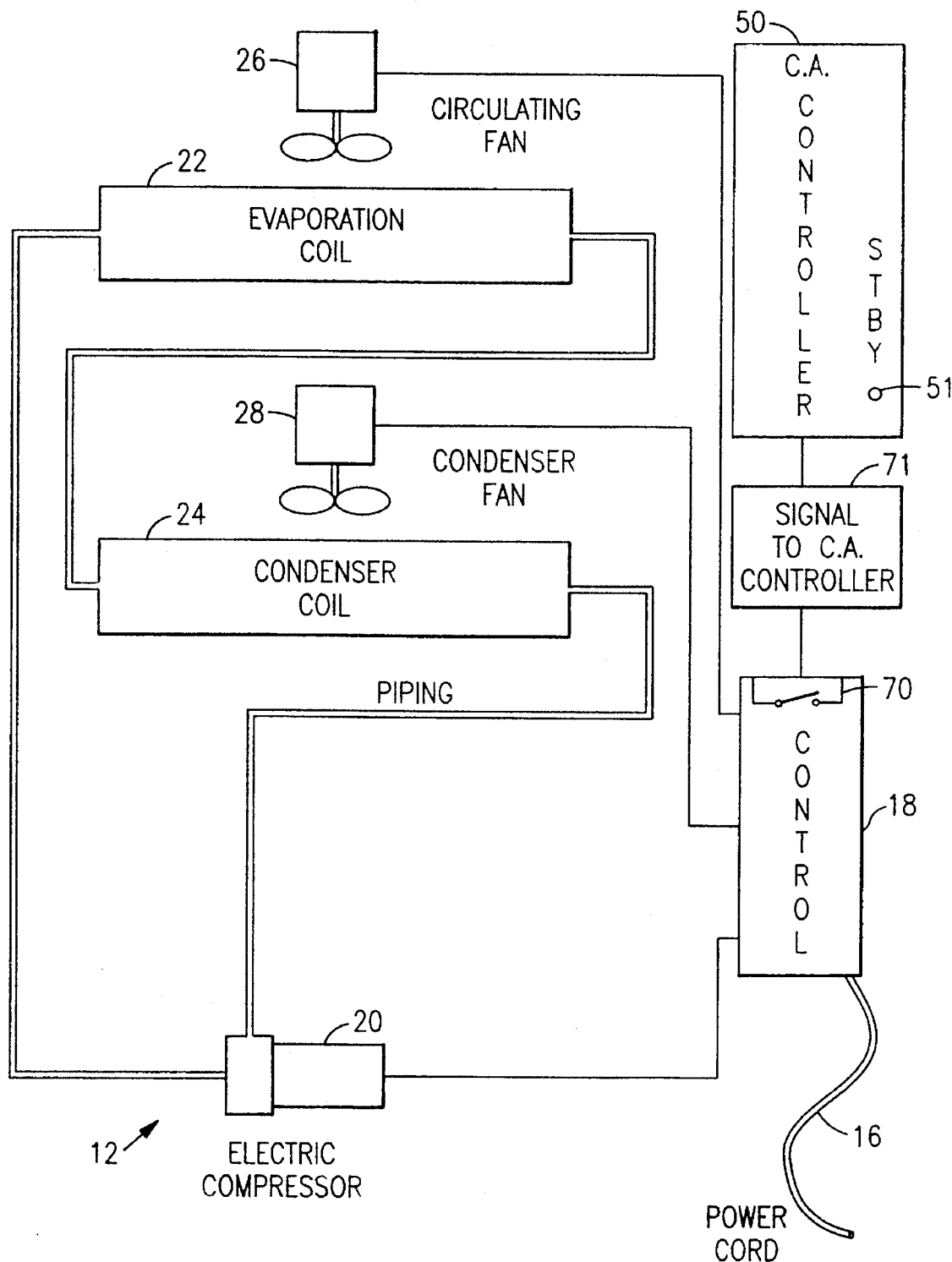
FIG. 2 is a schematic representation of a refrigeration unit of the type used in the container of FIG. 1.

With reference to FIG. 2 the refrigeration system 12 comprises a vapor compression refrigeration system which is well known in the prior art for such application. Briefly, the system includes an electrical power cord 16, providing electrical power to a refrigeration system controller 18. The controller 18 is preferably a programmed microprocessor which is adapted to receive inputs from the system operator and from various sensors in the refrigeration system and thereby control the operation of the refrigeration system components, in a manner which is well known in the art. The refrigeration system comprises a refrigeration circuit including an electrically driven compressor 20 communicating in turn with an evaporator coil 22, and a condenser coil 24. Appropriate evaporator fans 26 are provided to recirculate the atmosphere within the container 10 over the evaporator coil 22 and into the container where it is appropriately circulated and returned to the evaporator coil for further cooling, again as is conventional. A condenser fan 28 is provided to direct a cooling flow of atmospheric air over the condenser coil 24 to facilitate rejection of heat removed from the container 10. The refrigeration system controller 18 operates the various components, to maintain a selected set point temperature within the container as is conventional.

Figure 3:
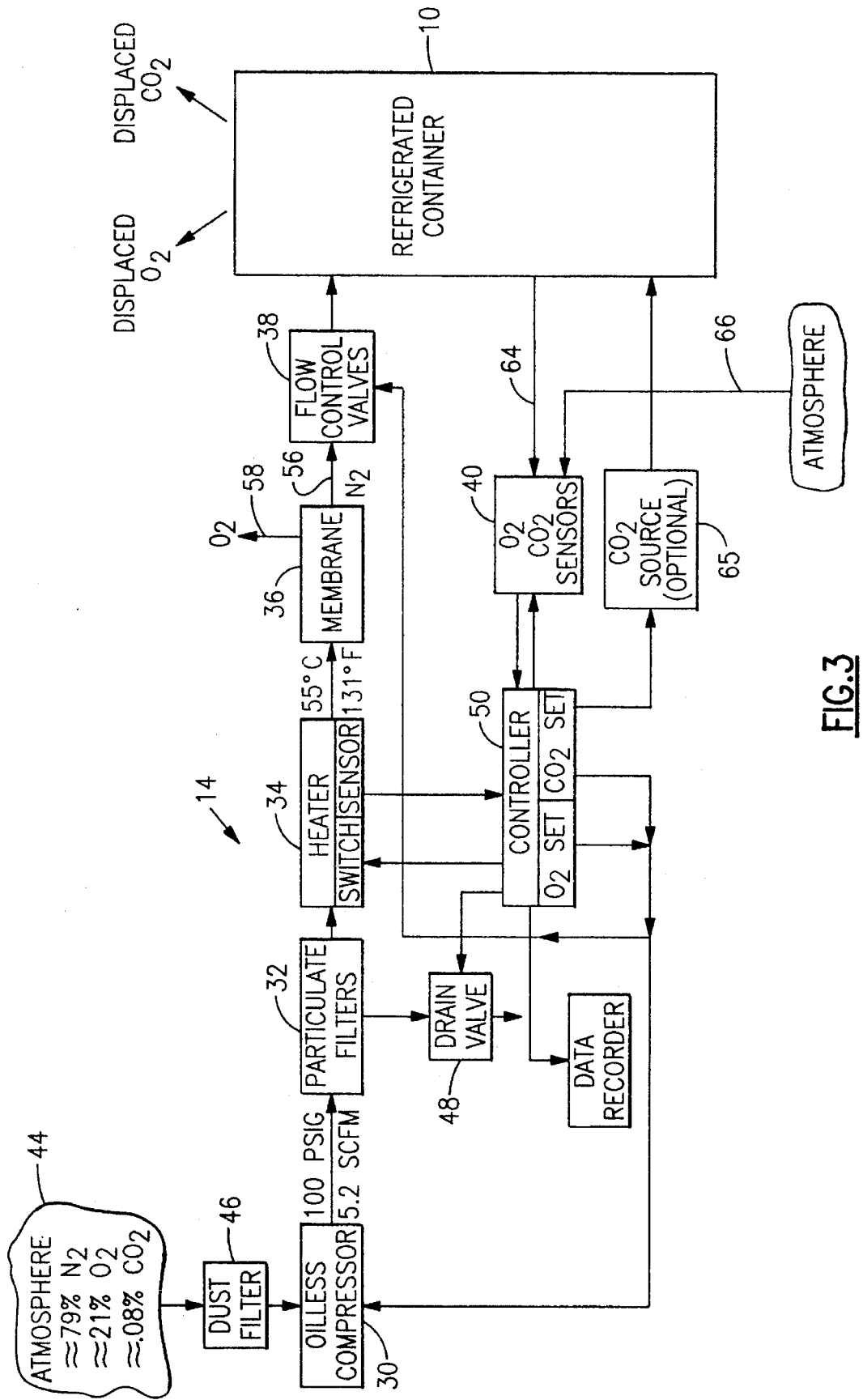
FIG. 3 is a block diagram of a controlled atmosphere system to be used in conjunction with the container unit as shown in FIG. 1.

The controlled atmosphere system 14 is illustrated in more detail in FIG. 3. The basic components of the controlled atmosphere system are an air compressor 30, a filter 32, an air heater 34, a nitrogen separation membrane 36, a system of metering valves 38, gas sensors 40 and a controller 50.

The purpose of the controlled atmosphere system is to control the amount of oxygen and carbon dioxide inside the refrigerated container 10 to change the rate of ripening of produce stored in the container. The system controls the amount of oxygen ($O_2$) and carbon dioxide ($CO_2$) by replacing it with nitrogen generated from the membrane 36.

With continued reference to FIG. 3, when the controlled atmosphere system 14 is running, air 44 from outside the container enters the compressor 30 through a dust filter 46. The atmospheric air is then compressed to a high pressure by the compressor 30. The high pressure air is then filtered by the particulate filter 32 to remove moisture and dirt before passing to the air heater 34. A normally closed drain valve 48 is provided on the filter 32. The drain valve 48 is adapted to be electrically opened when energized by the controlled atmosphere system controller 50. The controller is programmed to periodically open the drain value 48, for a short time, to remove residue which may build up in the filter 32.

High pressure air from the filter 32 passes to the air heater 34 where it is heated to the optimum operating temperature for the membrane 36 being used in the system. As indicated in the drawing the heater output is controlled to 55° C./131° F. This is the optimum operating temperature for a membrane separator 36 available as a Model 4241 Permeator from a company known as MEDAL MEMBRANE SEPARATION SYSTEMS DUPONT AIRLIQUIDE. The controlled atmosphere controller 50 receives inputs from a temperature sensor 52 and controls energization of a heater switch 54 to maintain the temperature of the compressed air leaving the air heater.

The warmed, high pressure air passing from the heater 34 enters the membrane 36, where it is separated into high purity nitrogen, which passes from the nitrogen outlet 56, and oxygen/and other gases which are passed to the oxygen outlet 58. The rate of separation occurring in the membrane separator 36 depends on the flow of air through the membrane. This flow rate is controlled by the pressure in the nitrogen outlet 56. The higher the pressure in the nitrogen outlet 56, the higher the nitrogen purity generated, and the lower the flow rate of nitrogen. The membrane 36 is capable of generating nitrogen purity levels greater than 99 percent. As the pressure in the nitrogen outlet 56 falls, the purity level of the nitrogen falls, and the flow rate increases.

The nitrogen enriched gas passing from the membrane through the outlet 56 passes to the flow control valves 38. The oxygen/other gasses from the oxygen outlet 58 are exhausted to the outside air.

The pressure on the nitrogen outlet 56 of the membrane 36 is regulated by the aforementioned flow control valves 38. To control the percentage of nitrogen present in the container, the controller 50 is programmed to cycle the flow control valves 38 to increase or decrease the amount of nitrogen in the container as required. The controller 50 may also add $CO_2$ from an external $CO_2$ source 65 if desired.

The controller 50 monitors the amount of oxygen and carbon dioxide in the container, using oxygen and carbon dioxide gas concentration sensors 40 via a sample line 64. Periodic calibration of the $O_2$ sensor to correct drifts with time and temperature require sampling outside air via line 66.

In operation, following loading of the container 10, and connection of the power cord 16 to an appropriate power source, the refrigeration system controller 18 is energized and programmed to a desired set point temperature for the load. At the same time the controller 50 for the controlled atmosphere system is energized and set for the desired oxygen and carbon dioxide ranges for the load.

With both the refrigeration system 12 and the controlled atmosphere system 14 energized and suitably programmed the refrigeration system will begin immediate operation according to its programmed operation. The controlled atmosphere system 14 however, will begin operation only when a controlled atmosphere enable switch 70 located in the refrigeration controller 18 is closed. The enable switch 70 is closed by the refrigeration system controller 18 when it determines that the operating conditions of the refrigeration system, and conditions within the refrigerated container 10 are such that it is acceptable to allow the controlled atmosphere machine to operate.

Figure 4:
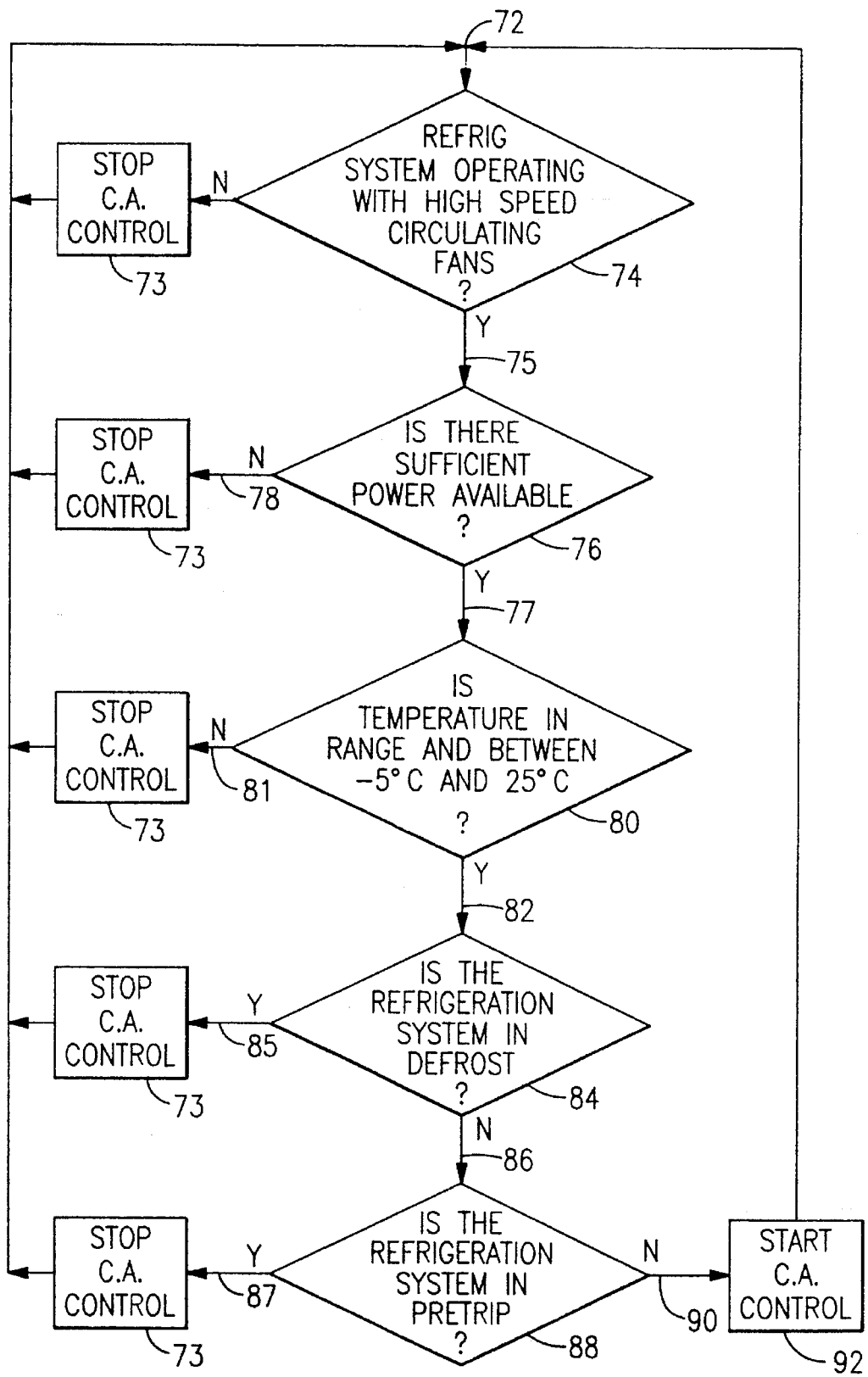
FIG. 4 is a flow diagram of a program, according to the present invention, showing the logic programmed into the microprocessor of the refrigeration system controller of FIG. 2.

FIG. 4 is a flow diagram which illustrates the conditions which are considered by the refrigeration system controller 18 in determining whether the controlled atmosphere enable switch 70 should be closed. As will be seen, at each step a specific inquiry is made by the refrigeration controller 18. At each step, if the desired answer is received, the controller moves to the next inquiry until all steps are satisfied. At that time the controller will close the enable switch 70 and send a 24 volt signal 71 to the controlled atmosphere controller 50 allowing it to start. On the other hand, at each step if the desired answer is not received the controller will move to the "stop CA control" result 73 which will either prevent enabling of the controlled atmosphere controller if it is not running, or will shutdown the controlled atmosphere controller if it has been operating. As will be appreciated, these inquiries are made by the refrigeration controller 18 on a continuing basis when the refrigeration system 12 is in operation.

The controlled atmosphere controller 50 is provided with an indicator light 51, labelled "STBY", as shown in FIG. 2. This light will be energized and thereby be visually perceivable by the operator whenever the controlled atmosphere enable switch 70 is open. This light tells the operator that the controlled atmosphere system is in a standby mode, operation having been suspended by the refrigeration controller 18.

Entering the logic at point 72 it is seen that the first step 74 is to inquire whether the refrigeration system 12 is operating with the evaporator/circulating fans 26 at high speed. If the answer to this inquiry is "NO" the controlled atmosphere system 14 will not be allowed to begin operation or will be shut down as the case may be. Operation of the circulating fans 26 at high speed is necessary in order to insure adequate cooling of the controlled atmosphere system air compressor 30.

If the circulating fans 26 are operating at high speed the "YES" branch 75 is followed and the controller next inquires, at step 76 as to whether sufficient power is available to operate the controlled atmosphere system. Because the refrigeration system 12 and the controlled atmosphere system 14 both draw power from the same source, it is necessary that sufficient power is available to operate both systems together before the controlled atmosphere system will be allowed to operate. The refrigeration controller 18 measures the power draw of the refrigeration system 12, adds that to the expected power draw of the controlled atmosphere system 14 and compares the total power draw to a predetermined specified limit. If at anytime, it is determined that there is insufficient power available to operate both systems, the controlled atmosphere system will be stopped as indicated by the "No" decision 78 in step 76.

If the previous conditions are satisfied, the controller 18 moves from step 76 via the "YES" branch 77 to the step 80 where it look at the temperature within the refrigerated container. The temperature of the air inside the container is controlled by the refrigeration system over a range extending from −30° C. to 30° C. On the other hand the specified operating range of the controlled atmosphere system is typically −5° C. to 25° C. Since the primary purpose of the integrated refrigeration/controlled atmosphere system is refrigeration, the refrigeration system controller first inquires as to whether the air temperature within the container is close to the set point temperature of the refrigeration system. In a representative system the refrigeration controller 18 may be programmed to a setpoint tolerance range of between ±0.5° C. to ±2° C. The second inquiry, assuming the container temperature is suitably close to the set point is whether the temperature within the container is within the operating temperature range of the controlled atmosphere system. In the preferred example given herein this range is −5° C. to 25° C. If both of these conditions are met as indicated at step 80, the controller then moves, via the "YES" branch 82, to step 84. If at any time the specified temperature conditions within the container are not met the controlled atmosphere enable switch 70 opens, via the "NO" branch 81, and the system is stopped.

Assuming the temperature conditions are satisfied and all previous conditions are satisfied at step 84 the controller determine if the refrigeration system is in its defrost mode of operation. Periodically the refrigeration system 12 automatically goes into a defrost cycle to remove frost from the evaporator coils 22. During this cycle the refrigeration controller stops the evaporator circulating fans 26 and turns on electric heaters (not shown). The controlled atmosphere compressor 30 relies on the air circulating inside the container box for cooling. If this air is to warm, there would be insufficient cooling, and the compressor could be damaged. Therefore during a defrost cycle, the controlled atmosphere system is not allowed to begin operation or is terminated via "YES" branch 85.

Assuming the refrigeration system is not in defrost the logic moves, via the "NO" branch 86, to step 88 to determine whether the refrigeration system is in a "pretrip" mode of operation. During its pretrip mode the refrigeration system is determining if all of the features of the refrigeration system are operating correctly. During this cycle, the different components of the refrigeration system are cycled on and off for test purposes. Running the controlled atmosphere system during this cycle could effect the results of the test. Accordingly, if the refrigeration system is in its pretrip mode the controlled atmosphere system will not be allowed to operate or will be terminated if in operation as shown at the "YES" branch 87.

It will be appreciated with reference to FIG. 4 that, only when all of the described conditions are satisfied will the controlled atmosphere enable switch 70 in the refrigeration controller 70 close to allow a 24 volt electrical signal to pass to the controlled atmosphere system to allow the controlled atmosphere system to commence operation based on its own control algorithm, not forming a part of the present invention. Such condition is represented by the "YES" branch 90 from step 88, wherein "Start C.A. Control" 92 represents the closing of the enable switch 70.

What is claimed is:

1. Apparatus for controlling the temperature and the atmosphere within a confined space comprising:

a controlled atmosphere system for controlling the atmosphere within the space;

electrical control means for controlling operation of said controlled atmosphere system, said controlled atmosphere system control means being operative to control said controlled atmosphere system only when it is receiving an enabling signal;

a refrigeration system for controlling the temperature within the space;

a programmable electrical control means for controlling and monitoring the operation of said refrigeration system, said refrigeration system control means including, means for determining if the controlled atmosphere system should be operating, and, for generating a controlled atmosphere system enabling signal when said determination has been made; and means for communicating said enabling signal from said refrigeration system controller to said controlled atmosphere system controller.

2. The apparatus of claim 1 wherein said means for determining if the controlled atmosphere system should be operating comprises, means for determining whether one or more operating conditions of the refrigeration system meet certain predetermined conditions.

3. The apparatus of claim 2 wherein, when any of said operating conditions fails to meet its said predetermined condition, said means for determining and generating will fail to generate said enabling signal.

4. The apparatus of claim 2 wherein said refrigeration system and said controlled atmosphere system are both powered from the same source of electrical power, and, wherein one of said predetermined conditions is, whether said source has sufficient power available to operate both of said systems, if not, said enabling signal will not be generated.

5. The apparatus of claim 2 wherein said refrigeration system has a pretrip mode of operation and, one of said predetermined conditions is whether said refrigeration system is in said pretrip mode, if it is, said enabling signal will not be generated.

6. The apparatus of claim 2 wherein said refrigeration system includes evaporator fans for circulating atmosphere within said confined space, and, one of said predetermined conditions is whether said evaporator fans are operating to circulate atmosphere, if not, said enabling signal will not be generated.

7. The apparatus of claim 6 wherein said evaporator fans have more than one operating speed, and wherein said predetermined condition is whether said fans are operating at their highest speed.

8. The apparatus of claim 2 wherein said refrigeration system has a defrost mode of operation, and, one of said predetermined conditions is whether said refrigeration system is in said defrost mode, if it is, said enabling signal will not be generated.

9. The apparatus of claim 2 wherein said refrigeration system has a predetermined setpoint tolerance operating range, and, wherein one of said predetermined conditions is whether said refrigeration system is operating within said setpoint tolerance range, and, if it is not, said enabling signal will not be generated.

10. The apparatus of claim 9 wherein said controlled atmosphere system has a predetermined temperature operating range, and in addition to operating within said setpoint tolerance range, one of said predetermined conditions is whether said refrigeration system is operating within said predetermined operating range, and, if it is not, both within said setpoint tolerance range, and said predetermined operating range, said enabling signal will not be generated.

* * * * *